W. L. PATTERSON.
PROJECTION APPARATUS.
APPLICATION FILED NOV. 20, 1909.
961,253.
Patented June 14, 1910.
5 SHEETS—SHEET 1.
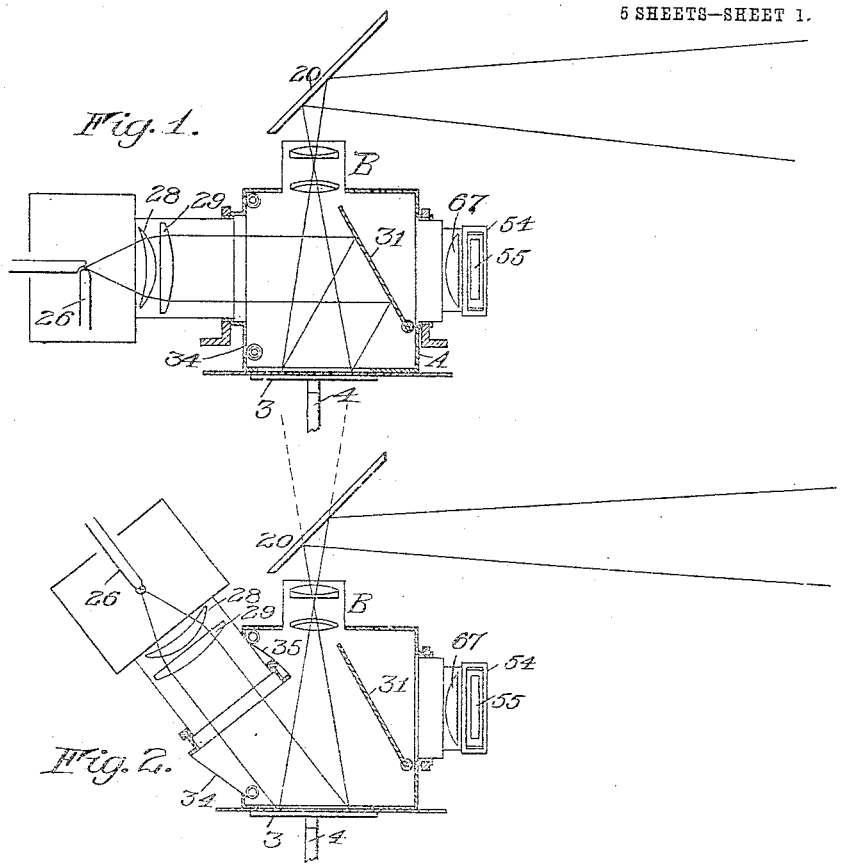
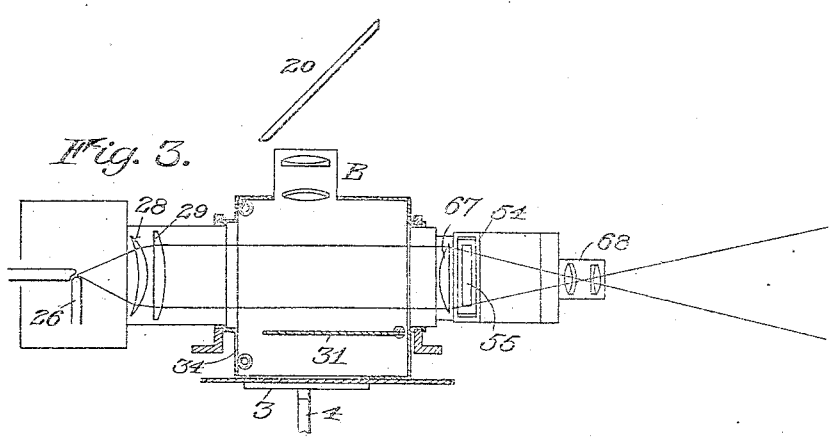

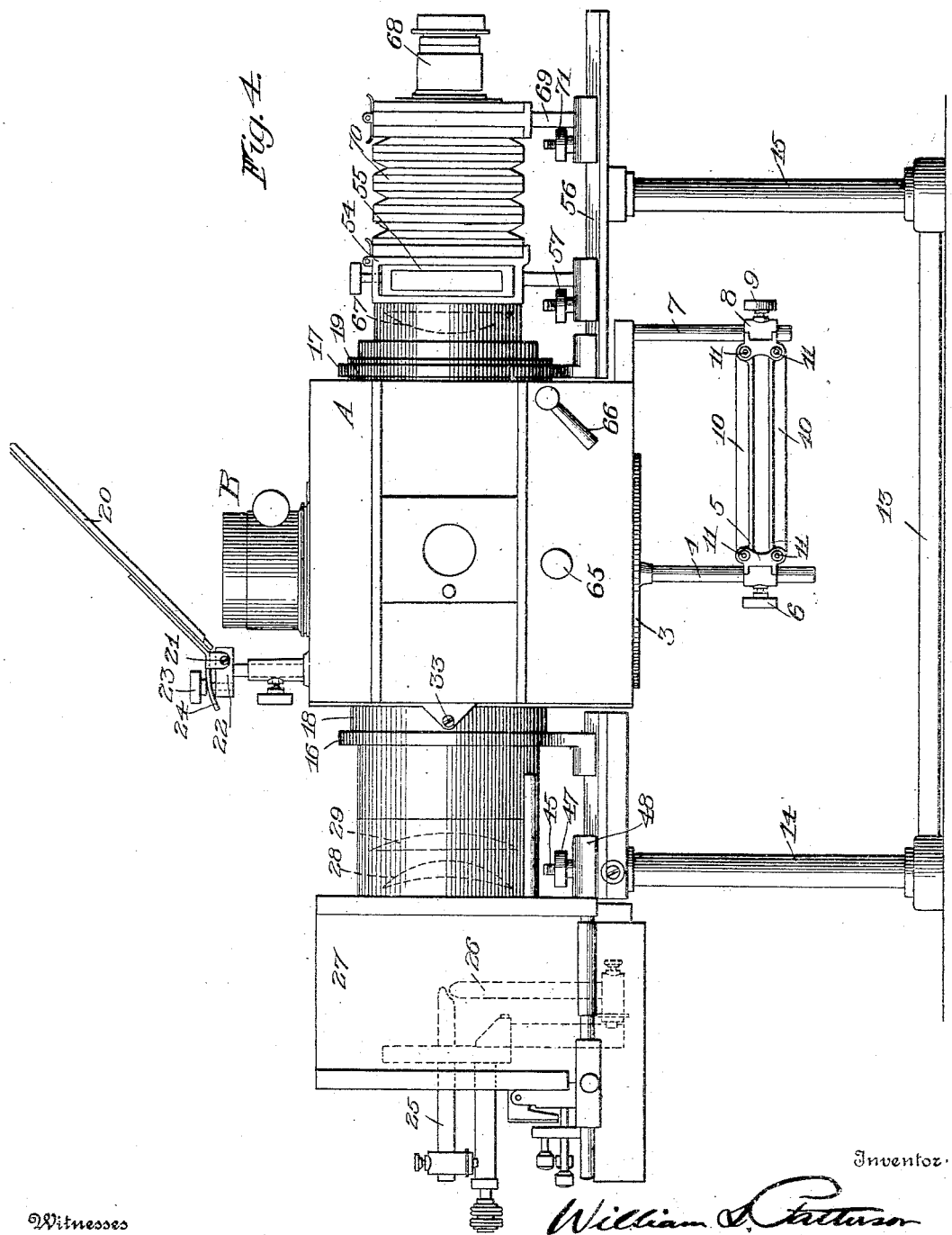

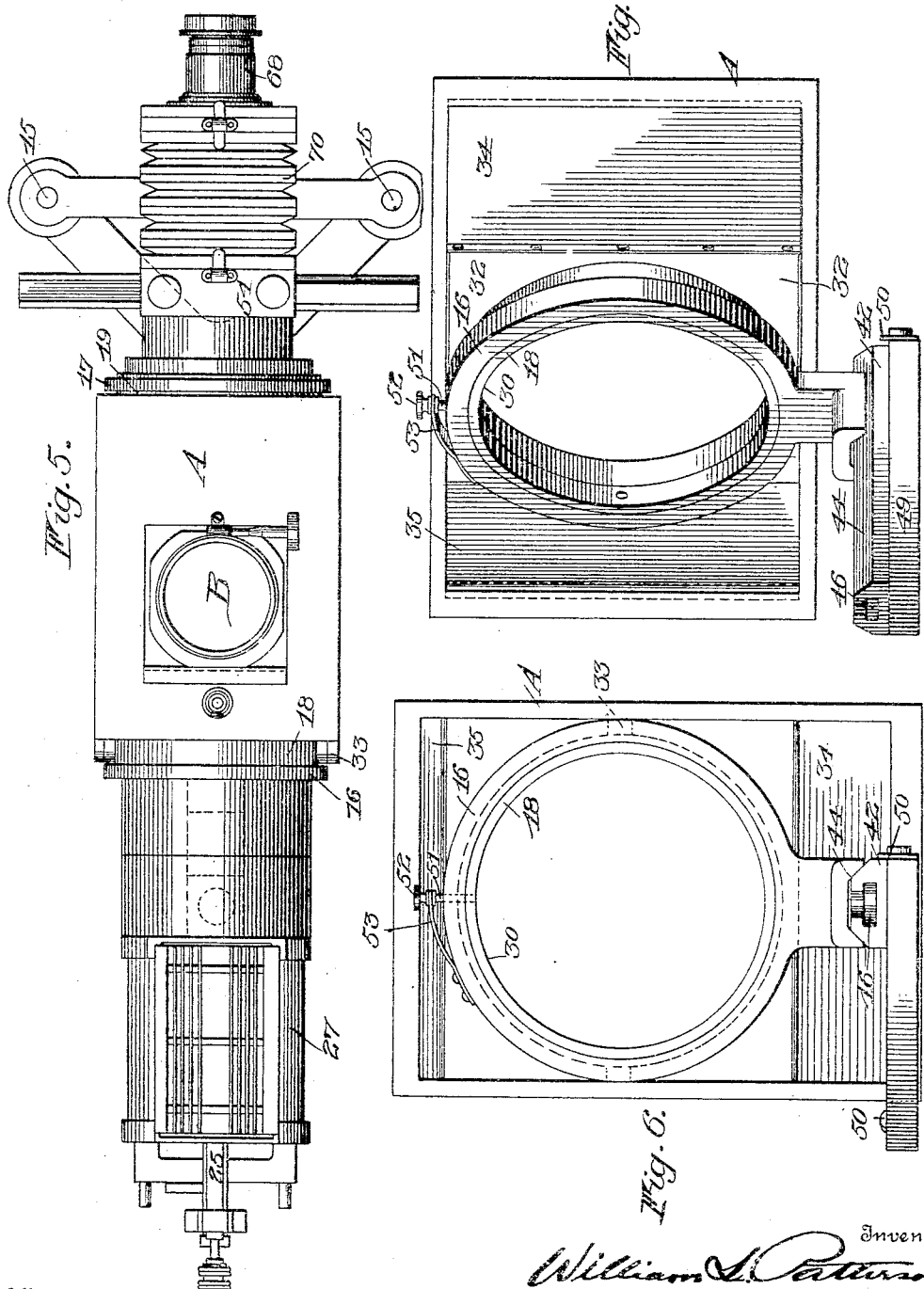

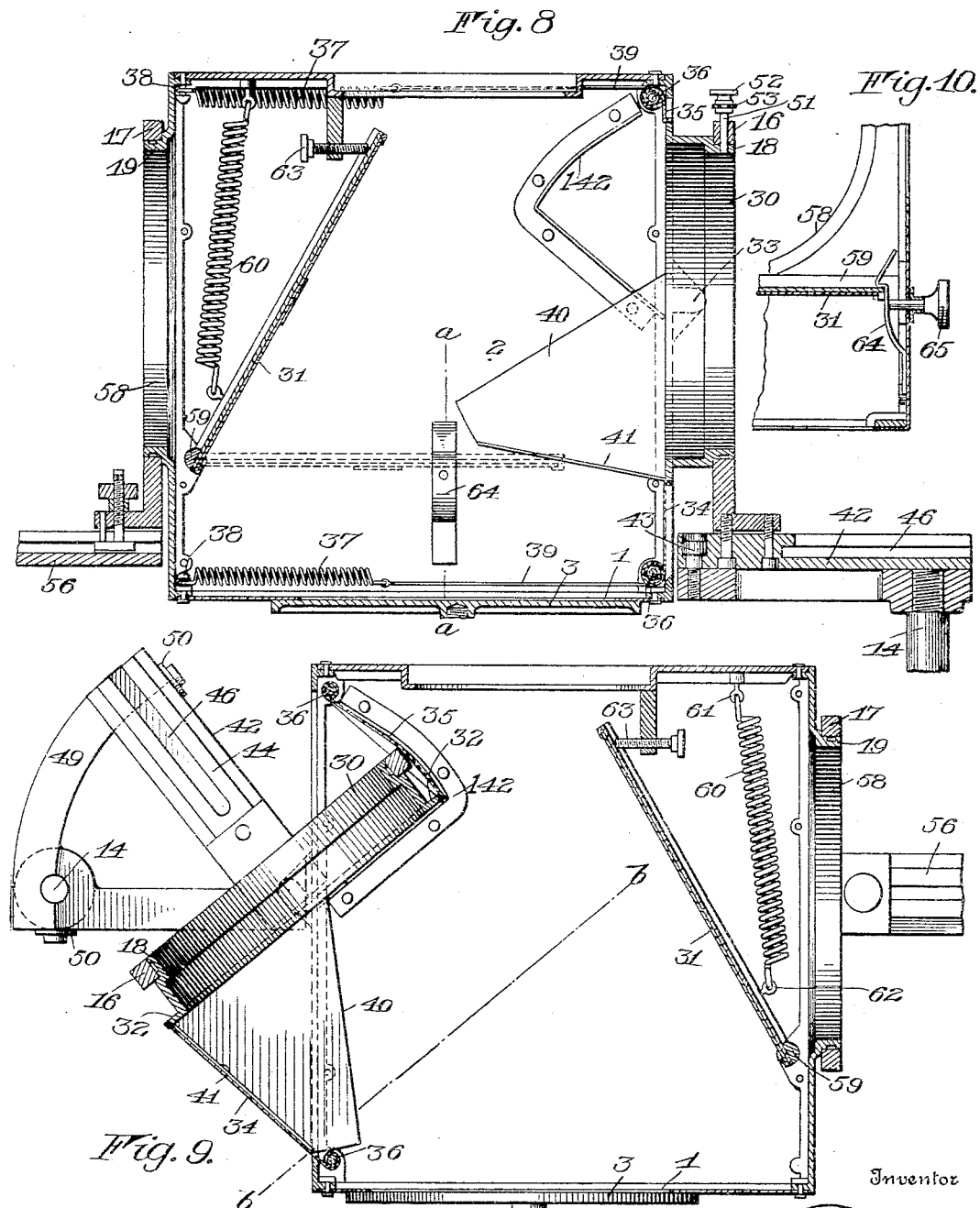

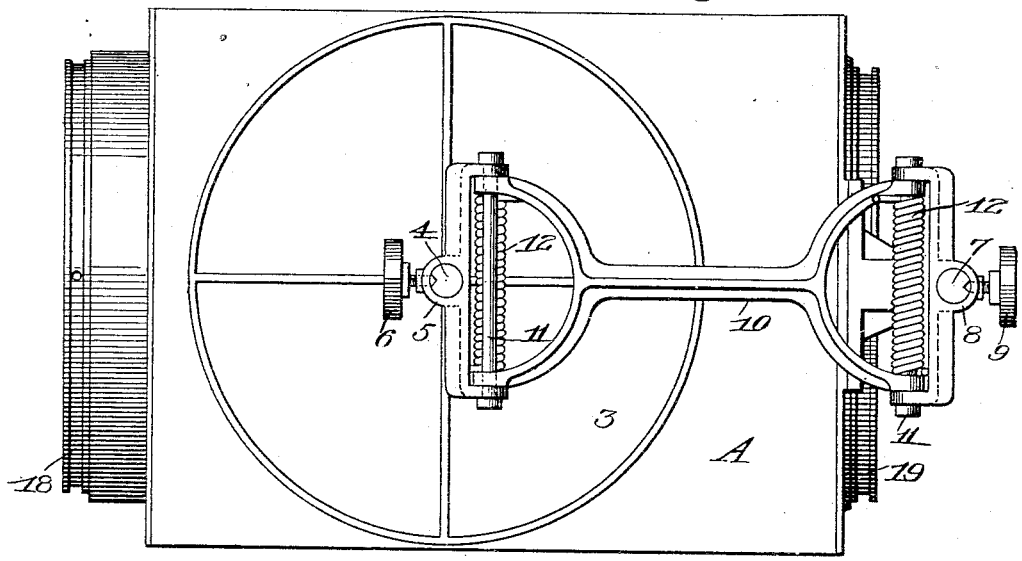

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

961,253.  Specification of Letters Patent.  Patented June 14, 1910.

Application filed November 20, 1909. Serial No. 529,069.

*To all whom it may concern:*

Be it known that I, WILLIAM L. PATTERSON, of Rochester, in the county of Monroe and State of New York, have invented certain new and useful Improvements in Projection Apparatus; and I do hereby declare the following to be a full, clear, and exact description of the same, reference being had to the accompanying drawings, forming a part of this specification, and to the reference characters marked thereon.

The present invention relates to apparatus for projecting images of objects upon a suitable screen, and it has for an object to provide a construction which will permit the projection of opaque objects located in any plane or position.

Another object of the invention is to permit the illumination of an opaque object with either direct or reflected rays from the illuminator whereby the apparatus is adapted for a greater number of uses.

Still another object is to adapt the apparatus for the projection of transparent objects.

To these and other ends the invention consists in certain improvements and combinations of parts, all of which will be hereinafter more fully described, the novel features being pointed out in the claims at the end of the specification.

In the drawings: Figure 1 is a diagrammatic view showing the apparatus adjusted for projection of opaque objects by reflection of the light rays onto the object; Fig. 2 is a diagrammatic view showing the apparatus adjusted for projection of opaque objects, with the rays from the condenser carried directly to the object; Fig. 3 shows diagrammatically the apparatus adjusted for the projection of transparent objects; Fig. 4 is a side elevation of the apparatus; Fig. 5 is a top view with the inverting mirror, shown in Fig. 4, removed; Fig. 6 is an end view of the chamber or casing in which the opaque objects are supported, the illuminator being removed; Fig. 7 is a view similar to Fig. 6 in which the wall provided with light receiving openings for the casing is shifted for the purpose of directing the rays from the illuminator immediately upon the opaque object; Fig. 8 is a longitudinal sectional view of the chamber or casing for the opaque objects, the reflector in the casing being shown in full lines in a position to direct the rays upon the opaque object support, and being shown in dotted lines in a position to permit direct projection; Fig. 9 is a horizontal section through the opaque object holding casing, the member with the light receiving opening being shifted to direct the rays immediately onto an opaque object; Fig. 10 is a detail sectional view on the line *a—a* of Fig. 8, illustrating the manner in which the reflector within the casing is held in the position shown in dotted lines in Fig. 8; Fig. 11 is a view of that side of the casing upon which the opaque object supporting member is arranged; Fig. 12 is a section on the line *b—b* of Fig. 9; and Fig. 13 is a detail view of the light excluding means which becomes effective when the member with the light receiving opening is shifted.

In the embodiment of the invention herein illustrated there is employed a casing or member A having means for holding opaque or other objects which becoming illuminated are projected upon the screen by a suitable projector B whose optical axis in this instance is perpendicular to the plane of the object holder.

The object holder preferably is formed by providing an opening 1 in the wall of the casing in order that any suitable object may be exposed to the interior or chamber of the casing, being held within the chamber or against the perforated wall of the casing by a supporting member 3 which, in this instance, is in the form of a disk coöperating with the exterior wall of the casing about the opening 1. This disk may be held against the casing wall with a yielding pressure, and to this end may carry a guide member 4 on which a slide 5 is adjustably secured by a set screw 6. To this slide may be pivotally secured at 11 two or more parallel levers or arms 10 which are also pivotally mounted to one side of the object opening, preferably being pivoted at 11 to a slide 8 which is adjustable by thumb screw 9 on a guide 7 secured to the casing. This arrangement gives a parallel motion and causes the supporting member 3 to move toward and from the casing in parallel lines, it being apparent that when the slides 5 and 8 are near the free ends of the guides 4 and 7 the object holding member 3 will hold larger objects than when said slides are near the inner ends of the guides 4 and 7. This arrangement also permits the object supporting member to be entirely removed so that the wall of the casing with the object opening may be placed directly against the object which would be impossible to support upon the object supporting member 3. Springs 12 surrounding the pivots 11 may act on the parts in a direction to move the supporting disk toward the casing.

It is preferred to adjustably mount the casing A so that the object opening may be disposed in different planes at angles to each other, for it is then possible to locate the apparatus below, to either side of, or above the object to be projected, thus permitting its use in connection with stationary objects, such for instance as large machinery, the working of which it is desired to inspect on an enlarged scale. In this instance the casing is rotatably supported on a frame comprising preferably a base 13, a rear upright member 14, and a front upright member 15 consisting of two standards spaced apart to provide an opening through which a beam of light may be projected when the casing is shifted 180° from the position shown in Fig. 1, the rear and front members 14 and 15 providing a space between them through which the parts carried by the casing may operate. The rear and front members 14 and 15 carry bearing members 16 and 17 preferably of ring formation and surrounding annular or ring bearing members 18 and 19 projecting from opposite ends of the casing A.

The projector B, which may be of any suitable construction is so arranged that in any position to which the object holder is adjusted it will receive rays from an object on the holder. Preferably the projector is carried by the casing A on the wall of said casing opposite the opening 1, its optical axis being arranged transverse to the axis of rotation of the casing. In order to project the image in the direction of the axis of rotation of the casing, and at the same time to invert the image in one direction, there may be employed a mirror or reflector 20 arranged at an angle to the optical axis of the projector and receiving rays therefrom. Preferably this reflector is pivotally mounted at 21 upon an adjustable standard 22, a set screw 23 serving to adjust the angle of the reflector by engaging with a spring extension 24 on said reflector.

Any suitable means may be employed for directing light rays upon the object on the object holder. In the present instance there is employed an illuminator preferably in the form of an electric arc lamp, 25 and 26 indicating the carbons of the lamp which are arranged within the casing 27 and operable in any suitable manner. The rays from the lamp are preferably condensed by lenses 28 and 29 and are projected as a beam of parallel rays through a light receiving opening 30 into casing A where they are received by a reflector mirror 31 arranged at an angle to the axis of the beam and directing the latter toward the opening 1.

The mirror or reflector 31 for directing the rays toward the object on the object holder 1, of course absorbs a portion of the light rays, but owing to the adjustment of the holder in a circle it is difficult to obtain a more direct action of the rays upon objects located in various positions. It is, however, possible to obtain a direct projection of the rays upon the object in two positions of the casing, and to this end the light receiving opening 30 and the bearing 18 of the casing are mounted on a wall or member 32 which is adapted to swing on pivots 33 when the latter are upright. This member is connected to the casing in such a manner that when said member swings on its pivots light is excluded from the casing. In the present instance the wall 32 has curtains 34 and 35 secured to it on opposite sides, said curtains being rolled around rods or rollers 36 journaled in the casing and drawing normally on the curtains to roll the latter, this preferably being effected by springs 37 secured to one end at 38 within the casing and connected at their other ends by a flexible connection 39 to the rollers or rods 36. When the member 32 turns the curtain 34 swings outwardly while the curtain 35 swings inwardly. When the wall has reached its extreme position light excluding members 40, extending inwardly from opposite edges of the swinging member 32, close the spaces between the swinging member and the casing A, and flanges 41 on the light excluding members 40 coöperate with the curtain 34 to form light tight joints with the latter. Light tight joints between the upper and lower edges of the curtain 35 are formed by V-shaped flanges 142 secured to the inner faces of the walls of the casing.

In order to permit the illuminator, together with the condensing lenses 28 and 29 to swing with the member 32, there is mounted on the rear frame member 14 a swinging carrier 42 which turns on the pivot 43 coincident with the pivots 33, when the latter are vertically arranged, the said carrier having mounted thereon the ring bearing member 16 which coöperates with the bearing member 18 on the casing. An arcuate guide 49 on the rear frame member 14 serves to guide the carrier in its movement, and stops 50 at the ends of the guide limit the said movement. The carrier is also provided with a way 44 on which is adjusted the illuminator, the latter being held thereon by a bolt 45 whose head works in the slot 46 in the carrier and which has a thumb nut 47 operating thereon to clamp the forward extension 48 of the illuminator to the carrier.

To the end that it may definitely be determined when the pivots 33 are alined with the pivot 43 there is employed a positioning device comprising, in this instance, a plunger 51 carried by the ring bearing 16 and adapted to enter either of two openings in the bearing 18 under the action of spring 53 when the proper position has been reached, the plunger being provided with a finger piece 52 permitting the plunger to be drawn from the opening against the action of the spring.

It is apparent that when the positioning plunger 51 enters the opening in the bearing 18, the carrier 42, with the illuminator and condensing lenses 28 and 29 may be swung about its axis 43 and will, by reason of the engagement of the bearing ring 16 with the bearing 18, also effect the turning of the light opening carrying member 32 on its pivots 33, thus permitting the rays from the illuminator and lenses 29 to be directed immediately upon an object on the object supporting member 3, or to the opening 1, and the object becoming illuminated has its image projected by the projector B.

It is desirable to provide a projection apparatus which in addition to projecting images of opaque objects may also project images of transparent objects. To this end there is combined with the hereinbefore described construction an object holder 54 adapted to receive transparent slides through the opening 55 in its side and preferably supported upon a guide 56 which may be arranged on the forward frame member 15, said holder being adjustable on the way, and held thereon by a clamping nut 57 in the same manner as that employed for securing the illuminator to the carrier 42.

To permit the rays from the illuminator to reach the object holder 54 the reflector 31 is movable in order that the rays may pass through an opening 58 in that wall of the casing A opposite the light receiving opening 30. Preferably the reflector is pivoted at 59 and is held so as to reflect the rays to the opaque object opening 1 by a spring 60 one end of which is secured at 61 to the casing and the other end to the reflector at 62, an adjustable stop 63 serving to properly position the reflector. To hold it away from reflecting position so that the rays may pass through the opening 58 to the object holder 54 there may be employed a spring latch 64 coöperating with one side of the reflector and operable from the exterior of the casing by a finger piece 65, the reflector being movable to the latch by a hand piece 66 also arranged on the exterior of the casing A.

Before the rays reach the object holder 54 they pass through a condenser lens 67 which turns the beam of parallel rays, produced by the lens 29, into converging rays which pass through the object in holder 54 to the projector 68. The latter may be mounted in any suitable manner, but preferably it is arranged on the support 69 that is adjustable toward and from the object holder on the way 56, and is connected to said object holder by a bellows 70 or other suitable inclosure, a nut 71 serving to hold the projector support in its adjusted position in the same manner as that described for holding the illuminator to its guide way 44.

The operation of the invention will be understood from the foregoing description, but it may be summarized as follows: Assuming that it is desired to project the image of an opaque object which may be located in a vertical plane, the illuminator and the casing A are adjusted in the manner shown in Fig. 9 so that the light rays from the condenser pass immediately to the opaque object which may either be located upon the support 3 or the support 3 may be entirely removed and the casing arranged to abut the object so that the latter will lie at the opening 1. The object then becomes illuminated and the rays therefrom passed through the projector are inverted in two directions and, if desired, are directed upon the reflector 20 which will reinvert them and correct for one of the inversions produced by the projector B, the other inversion produced by the projector being corrected, if desirable, by inverting the position of the object in the first instance. If it is not possible to position vertically the object to be projected, the illuminator is positioned relatively to the casing A so that the rays from the lens 29 are thrown onto the mirror 31 while the casing is rotated so that the opening 1 lies in the desired position either over, under, or to either side of the object. In any of these positions rays directed upon the mirror will be thrown to the object which becoming illuminated has its image projected by the projector B. If the object to be projected is transparent then the handle 66 is operated to shift the reflector 31 into engagement with the latch 64 so that rays from the illuminator may pass directly to the condensing lens 67 to illuminate the object which is located in the holder 54, the image of the object being projected by the projector 68.

From the foregoing it will be seen that there has been provided a projection apparatus which is capable of projecting images of any kind of objects, whether the same be opaque or transparent. The object, when opaque, may be located in any position, thus making it possible to project images of stationary objects. This is a very desirable feature for it is possible to illustrate upon an enlarged scale the working of any machine, parts of which are so located that personal inspection is undesirable or impossible.

I claim as my invention.

1. In a projection apparatus, the combination with a supporting frame, of a casing having an object opening therein and adjustable on the supporting frame to permit the opening to lie in different planes at angles to each other, a projector arranged to receive rays from an object at the opening in any position to which the latter may be adjusted, and means for directing light rays into the casing onto an object at the opening.

2. In a projection apparatus, the combination with a supporting frame, of an object holder adjustable on the frame to hold an object in different planes at angles to each other, a projector arranged to receive rays from an object held by the holder in any position to which the latter may be adjusted, and means for directing light rays onto an object held by the holder.

3. In a projection apparatus, the combination of a casing having an object opening therein and mounted to swing to permit the opening to lie in different planes at angles to each other, with a projector arranged to receive rays from an object at the opening, in any position in which the latter may be located, and means for directing light rays into the casing onto an object at the opening.

4. In a projection apparatus, the combination of a casing having an object opening therein and mounted to move to permit the opening to lie in different planes at angles to each other, with a projector arranged to receive light rays from an object at the opening and movable with the casing to maintain its optical relation to the opening, and means for directing light rays into the casing onto an object at the opening.

5. In a projection apparatus, the combination of a rotatable casing having an object opening at one side thereof, with a projector carried by the casing in a position to project light rays received from an object at the opening, and means for directing light rays into the casing and onto an object located at the opening.

6. In a projection apparatus, the combination with a condenser receiving light rays from a suitable source, of a casing having an object opening and adjustable to change the position of the opening to agree with differently located objects, while maintaining the object opening illuminated by rays from the condenser, and a projector arranged to receive rays from an object at the opening in any position to which the opening is adjusted.

7. In a projection apparatus, the combination with an illuminator, of a casing having an object opening therein adapted to receive rays from the illuminator and rotatable relatively to the latter to adjust the opening to different positions, and a projector receiving rays from an object at the opening in any position to which the opening may be adjusted.

8. In a projection apparatus, the combination with an illuminator, of a casing having an object opening therein adapted to receive rays from the illuminator and movable relatively to the latter to adjust the opening to different positions, and a projector arranged to receive rays from an object at the opening and movable with the casing to maintain its optical relation to the object opening.

9. In a projection apparatus the combination with an illuminator, of a casing rotatable relatively to the illuminator and having an object opening therein receiving rays from the illuminator, and a projector rotatable with the casing and arranged for receiving rays from an object at the opening.

10. In a projection apparatus, the combination with a projector and an illuminator, of a holder for opaque objects adapted to receive light rays from the illuminator, and means permitting said holder to be moved relatively to the illuminator to different planes at angles to each other and in directions to maintain optical relation with the illuminator and the projector.

11. In a projection apparatus, the combination with a condensing lens, of a member rotatable about the optical axis of the condensing lens and carrying a holder for opaque objects, a reflector for receiving rays from the lens and directing them onto the object holder, and a projector for receiving rays from an object on the object holder.

12. In a projection apparatus, the combination with a support, of a projector and an object holder both adjustable on the support about an axis transverse to the optical axis of the projector.

13. In a projection apparatus, the combination with a support, of a projector and a member carrying the projector, having an object opening therein for opaque objects and adjustable on the support about an axis transverse to the optical axis of the projector.

14. In a projection apparatus, the combination with a support, of a projector, a casing carrying the projector, rotatable on the support about an axis transverse to the optical axis of the projector, a holder for opaque objects carried by the casing, a condenser for receiving rays from a suitable source of illumination, and a deflector for receiving rays from the condenser and directing them to an object on the object holder.

15. In a projection apparatus, the combination with a support, of a projector, a casing carrying the projector and rotatable on the support about an axis transverse to the optical axis of the projector, a holder for opaque objects rotatable with the casing, a condenser for receiving light rays from a suitable source, and a reflector rotatable with the casing and arranged within the latter at an angle to the optical axis of the condenser to direct rays upon the object holder.

16. In a projection apparatus, the combination with a supporting frame comprising a base and a pair of uprights, of bearings on said uprights, a casing having bearings coöperating with the bearings of the uprights permitting said casing to turn about a horizontal axis, a projector carried by the casing with its axis transverse to the axis of rotation of said casing, a holder for opaque objects carried by the casing in optical relation to the projector, and means for directing light rays onto the object holder.

17. In a projection apparatus, the combination with a casing having an opening therein and an opaque object support coöperating with the casing about the opening, of a guide supported upon one of said parts transverse to the plane of the opaque object support, a slide adjustable on the guide, a lever pivotally connected at one end to the slide and at the other end to the other of said parts, and a spring interposed between the slide and the lever.

18. In a projection apparatus, the combination with an illuminator and a condenser for the rays thereof, of a casing rotatable relatively to the illuminator, a projector carried by the casing with its optical axis transverse to the axis of rotation of the casing, a holder for opaque objects rotatable with the casing, a stationary holder for transparent objects arranged in optical relation to the condenser, a projector for the stationary object holder, and a reflector movable to one position to cause the rays from the condenser to pass to the holder for opaque objects and to another position to pass to the stationary object holder.

19. In a projection apparatus, the combination with a condenser, of a pair of object holders, a pair of projectors, one for each object holder, a pivotally mounted reflector movable to one position to deflect rays from the condenser onto one object holder, and movable to another position to permit the rays from the condenser to reach the other object holder, means tending to move the reflector to one position, and a latch for holding the reflector in the other positon.

20. In a projection apparatus, the combination with a condenser, of a pair of object holders, a pair of projectors one for each object holder, a reflector movable to a position to permit the rays from the condenser to pass to one object holder and to another position to reflect the rays from the condenser to the other object holder, a spring moving said reflector to one position, and a latch for holding the reflector in the other position.

21. In a projection apparatus, the combination with a condenser, of a pair of object holders, a pair of projectors one for each holder, a reflector movable to a position to permit the rays from the condenser to pass to one object holder and to another position to reflect the rays from the condenser to the other object holder, an adjustable stop for the reflector in the latter position, and a spring tending to hold the reflector against the stop.

22. In a projection apparatus, the combination with a pair of ring shaped bearings, of a casing having openings in opposite walls surrounded by bearings adapted to turn in the ring-shaped bearings, a condenser in proximity to one of the ring-shaped bearings for directing rays into the casing, a holder for transparent objects for receiving rays through the other ring-shaped bearing from the condenser, a projector for said transparent object holder, a holder for opaque objects rotatable with the casing, a projector for the latter, and a reflector within the casing movable to a position to permit rays to pass to the holder for transparent objects from the condenser and to another position to reflect rays from the condenser to the holder for opaque objects.

23. In a projection apparatus, the combination with a frame comprising a base and a pair of uprights thereon, of an illuminator supported by one upright, an object holder and projector supported by the other upright, a rotatably mounted casing arranged between the illuminator and the object holder, a condenser for directing rays into the casing and onto the object holder, an object holder on the casing, a projector for said object holder, and a reflector movable to a position to receive rays from the condenser and to direct them to the object holder on the casing.

24. In a projection apparatus, the combination with a frame comprising a base and a pair of uprights thereon having ways at their upper ends, of an object holder and projector adjustable on the way of one upright, an illuminator adjustable on the way of the other upright, a rotatable casing arranged between the illuminator and the object holder, an object holder carried by the casing, a projector for an object on the last named object holder, and a reflector adapted to receive rays from the illuminator and direct them onto the last named object holder.

25. In a projection apparatus, the combination with a pair of object holders, and devices permitting the projection of objects at either holder, of a condenser receiving rays from a suitable light source and mounted to swing in order to carry said rays to either object holder.

26. The combination with a casing, of an opaque object holder, a transparent object holder, devices permitting the projection of objects to either holder, and a condenser movable to carry the rays through the casing to either object holder.

27. In a projection apparatus, the combination with a casing, a pair of object holders, and devices permitting the projection of objects at either holder, of an illuminator and a condenser mounted for simultaneous movement relatively to the casing to a position where rays from the illuminator are directed through the casing to one object holder and also to a position where rays from the illuminator are directed through the casing to the other object holder.

28. In a projection apparatus, the combination with a casing, a pair of object holders and devices permitting the projection of objects at either holder, of an illuminator movable relatively to the casing to direct its rays through the casing to either object holder.

29. In a projection apparatus, the combination with a casing, of a movably mounted member having light excluding connection with the casing, a pair of object holders, a condenser movable with the movably mounted member to direct light rays from a suitable source to either object holder, and devices permitting the projection of objects at either object holder.

30. In a projection apparatus, the combination with a casing having a swingingly mounted wall provided with an opening, of light excluding means coöperating with said wall to prevent the passage of light from the casing, a condenser movable with said wall to direct light rays through the opening to either object holder, and devices permitting the projection of objects at either object holder.

31. In a projection apparatus, the combination with a casing having a swingingly mounted wall provided with an opening, of curtains connecting said wall with the casing to prevent the passage of light from the casing, a pair of object holders, a condenser receiving light rays from a suitable source and movable with the wall to direct rays to an object at either object holder, and devices permitting the projection of objects at either holder.

32. In a projection apparatus, the combination with a casing having a swingingly mounted wall provided with an opening, of a pair of curtains secured to opposite edges of the wall, spring tensioned rollers mounted on the casing and connected to the curtains, shields within the casing coöperating with opposite edges of one curtain, shields carried by the wall and coöperating with opposite edges of the other curtain, a pair of object holders, a condenser movable with the movable wall to direct light rays from a suitable source to either object holder and devices permitting the projection of objects at either object holder.

33. In a projection apparatus, the combination with a casing, having a movable wall provided with an opening, of a pair of object holders, devices permitting the projection of objects at either object holder and an illuminator and a condenser having connection with the movable wall and movable with the latter to direct light rays to either object holder.

34. In a projection apparatus, the combination with an opaque object holder, and a projector for the object holder, of a reflector arranged to direct rays onto the object holder, and a condenser receiving light rays from a suitable source and movable to one position to carry the rays to the reflector and to another position to carry them directly to the object holder.

35. The combination with a pair of object holders and devices permitting the projection of objects at either object holder, of a condenser movable to one position to direct rays to one object holder and to another position to direct rays to another object holder, and a reflector arranged to intercept the rays to one object holder and direct them to the other object holder.

36. In a projection apparatus, the combination with a projector and an opaque object holder, of a casing by which they are carried, rotatable about an axis transverse to the optical axis of the projector, a reflector in the casing, and a condenser receiving light rays from a suitable source and movable to one position to carry rays directly to the reflector and to another position to carry rays directly to the object holder.

37. In a projection apparatus, the combination with a projector, and an opaque object holder, of a casing by which they are carried, rotatable about an axis transverse to the optical axis of the projector and having a pivotally mounted wall provided with a ring-shaped bearing whose axis is coincident with the axis of rotation of the casing, a pivotally mounted bearing coöperating with the ring-shaped bearing on the casing, a condenser receiving light rays from a suitable source and connected to both bearings to move with the latter when their pivots are alined to carry the rays directly to the object holder, and a reflector in the casing also adapted to receive rays from the condenser to direct them to the object holder when the condenser is in another position.

38. In a projection apparatus, the combination with a holder for transparent objects and a projector therefor, of an illuminator and a condenser mounted to swing to a position to direct rays toward the holder for transparent objects, a casing rotatably mounted between the illuminator and the object holder, a holder for opaque objects on the casing to which rays from the illuminator may be directed, a projector for the holder for opaque objects and a reflector in the casing movable to intercept rays from the illuminator to the holder for transparent objects and direct them to the holder for opaque objects.

WM. L. PATTERSON.

Witnesses:
HENRY C. THON,
DANIEL M. SMITH.